(12) United States Patent
Garmark et al.

(10) Patent No.: US 11,438,668 B2
(45) Date of Patent: *Sep. 6, 2022

(54) MEDIA PROGRAM HAVING SELECTABLE CONTENT DEPTH

(71) Applicant: Spotify AB, Stockholm (SE)

(72) Inventors: Sten Garmark, Stockholm (SE); Lawrence Kennedy, San Francisco, CA (US); Johan Oskarsson, Stockholm (SE)

(73) Assignee: Spotify AB, Stockholm (SE)

( * ) Notice: Subject to any disclaimer, the term of this patent is extended or adjusted under 35 U.S.C. 154(b) by 87 days.

This patent is subject to a terminal disclaimer.

(21) Appl. No.: 16/996,725

(22) Filed: Aug. 18, 2020

(65) Prior Publication Data

US 2021/0037292 A1 Feb. 4, 2021

Related U.S. Application Data

(63) Continuation of application No. 16/029,798, filed on Jul. 9, 2018, now Pat. No. 10,791,376.

(51) Int. Cl.
*H04N 21/482* (2011.01)
*H04N 21/2387* (2011.01)

(52) U.S. Cl.
CPC ..... *H04N 21/4825* (2013.01); *H04N 21/2387* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 5,956,026 A * | 9/1999 | Ratakonda | G11B 27/28 715/767 |
| 7,610,358 B2 | 10/2009 | Benschoter et al. | |
| 9,286,938 B1 * | 3/2016 | Tseytlin | G11B 27/34 |
| 9,870,797 B1 * | 1/2018 | Tseytlin | G11B 27/28 |
| 10,674,197 B2 * | 6/2020 | Fuetsch | H04N 21/26603 |
| 2002/0051077 A1 | 5/2002 | Liou et al. | |
| 2006/0147018 A1 * | 7/2006 | Gupta | H04N 7/17318 379/211.02 |
| 2006/0210157 A1 | 9/2006 | Agnihotri et al. | |
| 2007/0154169 A1 * | 7/2007 | Cordray | H04N 5/76 386/230 |
| 2010/0241963 A1 | 9/2010 | Kulis et al. | |
| 2010/0332497 A1 | 12/2010 | Valliani et al. | |
| 2012/0245982 A1 | 9/2012 | Daniel | |
| 2016/0066004 A1 * | 3/2016 | Lieu | H04N 21/44204 725/29 |
| 2016/0112737 A1 | 4/2016 | Johnston et al. | |
| 2017/0070779 A1 | 3/2017 | Kim et al. | |
| 2017/0188078 A1 * | 6/2017 | Cansino | H04N 21/4825 |
| 2018/0041820 A1 * | 2/2018 | Xu | H04N 21/8456 |

(Continued)

*Primary Examiner* — Alexander Q Huerta
(74) *Attorney, Agent, or Firm* — Merchant & Gould P.C.

(57) ABSTRACT

Systems, devices, apparatuses, components, methods, and techniques for generating and playing a selectable content depth media program are provided. Media content items are edited to produce selectable depth media segments which are assembled into selectable depth media programs. A media-playback device is configured to navigate and play the selectable depth media program through interaction by a listening user. The user selects the desired content depth for each media segment.

19 Claims, 13 Drawing Sheets

(56) References Cited

U.S. PATENT DOCUMENTS

2018/0176652 A9   6/2018   Chane et al.
2018/0192150 A1*  7/2018   Schmidt ........... H04N 21/25866
2019/0166412 A1*  5/2019   Panchaksharaiah ........................
                                                                        G06F 16/4387

* cited by examiner

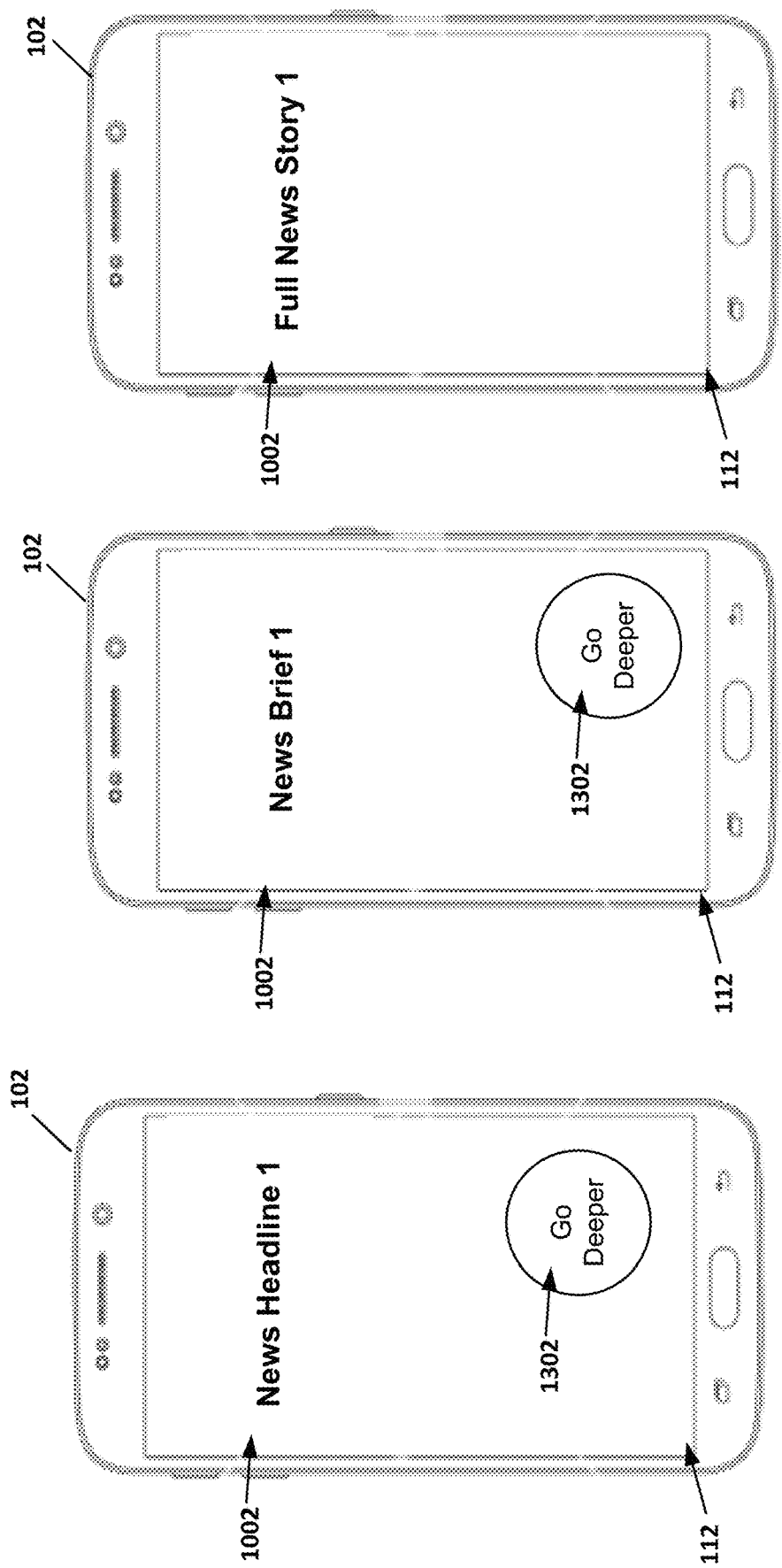

MEDIA PROGRAM HAVING SELECTABLE CONTENT DEPTH

CROSS-REFERENCE TO RELATED APPLICATIONS

This application is a Continuation of U.S. application Ser. No. 16/029,798, filed on Jul. 9, 2018, the disclosure of which is hereby incorporated by reference in its entirety. To the extent appropriate a claim of priority is made to the above-identified application.

BACKGROUND

Many people enjoy consuming media content while travelling or during other activities. The media content can include audio content, video content, or other types of media content. Examples of audio content include songs, albums, podcasts, audiobooks, etc. Examples of video content include movies, music videos, television episodes, etc. Using a mobile phone or other media-playback device, such as a vehicle-integrated media playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select desired media content. For media content that involves spoken words such as news programs or podcasts, it can be difficult to determine which programs to listen to or which parts of a program to listen to. Users may be interested in listening to the news, but only want to hear the details about certain stories. Similarly, when listening to podcasts, a user might only be interested in certain segments of a program instead of listening to the whole program. It can be difficult to navigate through such programs to listen to the audio content desired.

SUMMARY

In general terms, this disclosure is directed to methods and systems for generating and playing media programs having selectable content depth. In one possible configuration and by non-limiting example, a system accesses media content, edits the media content into selectable depth media segments, and communicates the segments to a media-playback device for playback. In some cases, selectable depth media segments are accessed from a media server by a media-playback device. An initial sequence of playback is modified by interactions made by the user with the media-playback device. These interactions send commands to skip segments of media content or to play more detailed, in-depth segments of media content. Various aspects are described in this disclosure, which include, but are not limited to, the following aspects.

In one aspect, a system for generating a media program having selectable content depth comprises: one or more media content sources having a plurality of media content items; a processing device; a media data store; and a memory device encoding instructions. When the processor executes the instructions, one or more media content items are accessed from the one or more media content sources. Each selectable depth media segment has a first version having a first duration, a second version having a second duration, and a third version having a third duration, wherein the second duration is longer than the first duration and the third duration is longer than the second duration. An initial playback sequence is generated of at least the first version of each selectable depth media segment. The selectable depth media segments are stored in a media data store. The selectable depth media segments are then communicated to a media-playback device. Instructions are received to adjust playback of the selectable depth media segments and playback is modified to an adjusted playback sequence.

In some embodiments, the memory device further comprises instructions that cause the processor to, prior to accessing the one of more of the plurality of selectable depth media segments, access one or more media content items from the one or more media content sources. Each of the media content items are edited to produce a first version having a first duration, a second version having a second duration, and a third version having a third duration, wherein the second duration is longer than the first duration and the third duration is longer than the second duration. The first version, second version, and third version of each media content item are assembled into a selectable depth media segment.

The media-playback device comprises a processing device, a content output device, and a memory device. The memory device encodes instructions that, when executed by the processor, cause the processor to receive the initial playback sequence of selectable depth media segments. The initial playback sequence of selectable depth media segments is played through the content output device. Instructions are received to adjust playback, the instructions are communicated to the system to adjust playback of the selectable depth media segments, the adjusted playback sequence is received from the system, and then the adjusted playback sequence is played on the media-playback device.

In one embodiment, the initial playback sequence of selectable depth media segments is the first version of a first selectable depth media segment followed by the second version of the first selectable depth media segment followed by the third version of the first selectable depth media segment followed by the first version of a second selectable depth media segment followed by the second version of the second selectable depth media segment followed by the third version of the second selectable depth media segment; the instructions to adjust playback are to skip from playing the first selectable depth media segment to the second selectable depth media segment; and the adjusted playback sequence of selectable depth media segments is to play the first version of the second selectable depth media segment before the third version of the first selectable depth media segment has concluded.

In another embodiment, the initial playback sequence of selectable depth media segments is the first version of a first selectable depth media segment followed by a first version of a second selectable depth media segment followed by a first version of a third selectable depth media segment; the instructions to adjust playback is to play a more in-depth version of the first selectable depth media segment as the first version of the first selectable depth media segment is playing; and the adjusted playback sequence of selectable depth media segments is to play at least the second version of the first selectable depth media segment before the first version of the second selectable depth media segment.

In another aspect, a method of generating a media program having selectable content depth comprises: accessing one or more media content items from one or more media content sources, editing the media content items to produce a headline version of the media content item, a brief version that is longer than the headline version, and a full version that is longer than the brief version, and assembling the versions of the media content items into selectable depth media segments each having a headline version, a brief version, and a full version of the same media content item. An initial playback sequence of at least the headline version of each selectable depth media segment is generated and stored in a media data store. The initial playback sequence of selectable depth media segments is communicated to a media-playback device, instructions are received to adjust playback of the selectable depth media segments, and then playback of the selectable depth media segments is modified to an adjusted playback sequence.

In yet another aspect, one or more computer-readable media having computer-executable instructions embodied thereon that, when executed by one or more computing devices, cause the computing device to: access one or more news programs from one or more sources, edit the news programs to produce individual news stories, edit the individual news stories to produce a headline version, a brief version that is longer than the headline version, and a full version that is longer than the brief version. The headline version, brief version, and full version of each media content item are assembled into a selectable depth news story which is stored in a media data store. Then the selectable depth new stories are communicated to a media-playback device.

BRIEF DESCRIPTION OF THE DRAWINGS

FIG. 13A shows an example user interface implementing the method of FIG. 11.

FIG. 13B shows another example user interface implementing the method of FIG. 11.

FIG. 13C shows another example user interface implementing the method of FIG. 11.

DETAILED DESCRIPTION

Figure 1:
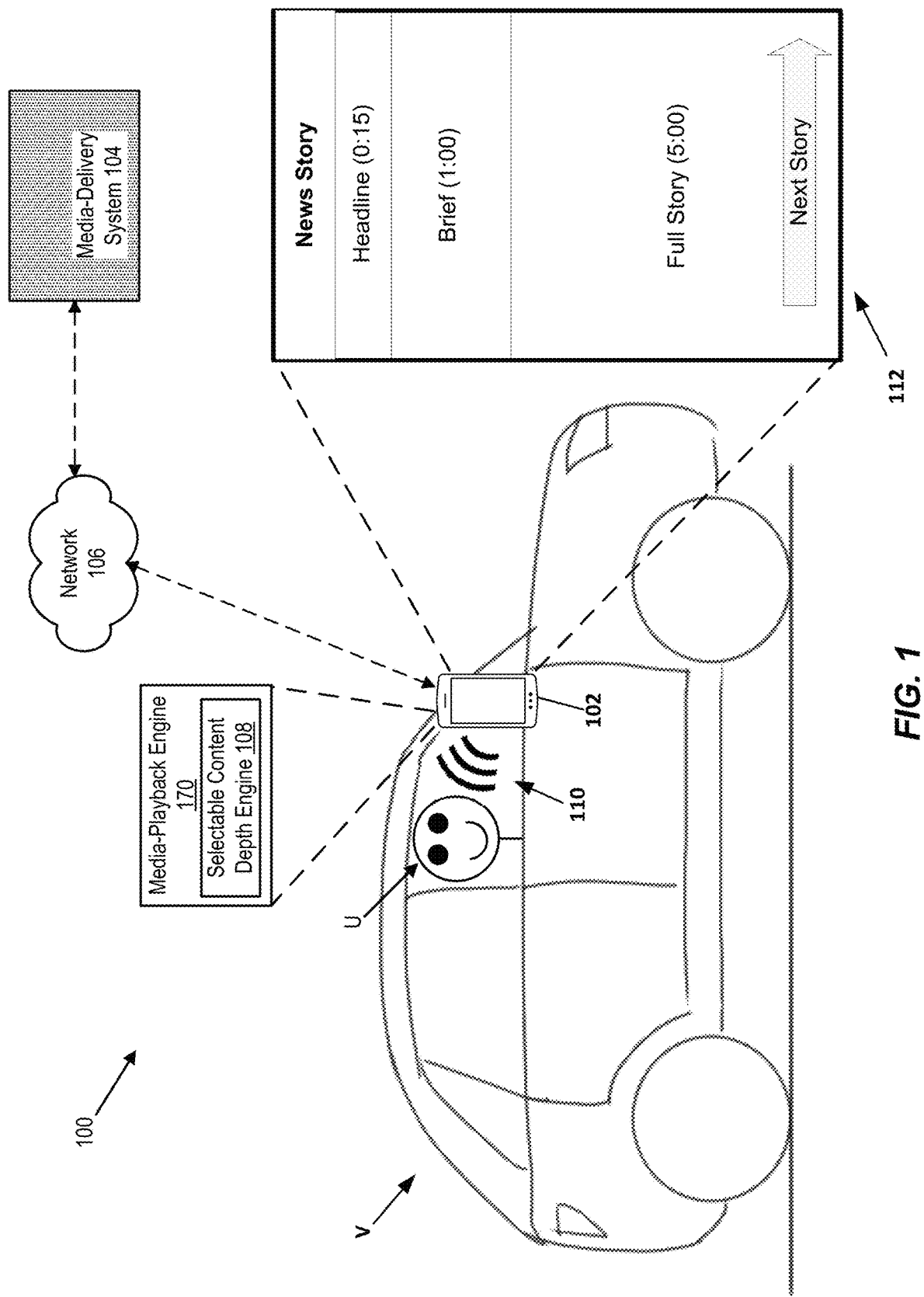
FIG. 1 illustrates an example media-playback system for generating and playing media content having selectable content depth.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content during various activities, including travelling. As used herein, the term "travel" and variants thereof refers to any activity in which a user is in transit between two locations. For example, a user is in transit when being conveyed by a vehicle, including motorized and non-motorized, public transit and private vehicles. A user is also in transit when moving between locations by other means such as walking and running.

Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, travelling (and in particular driving) is described as one example of an activity during which media content is consumed. However, it should be understood that the same concepts are similarly applicable to other forms of media consumption and to other activities, and at least some embodiments include other forms of media consumption and/or are configured for use during other activities.

FIG. 1 illustrates an example media-playback system 100 for media content playback during travel. The example system 100 includes a media-playback device 102 and a media-delivery system 104. The media-playback device 102 includes a media-playback engine 170 which includes a selectable content depth engine 108. The system 100 communicates across a network 106. Also shown, is a user U who is travelling in a vehicle V.

The media-playback device 102 plays back media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

The media-playback device 102 plays media content for the user during travel or other activities. The media content that is played back may be selected based on user input or may be selected without user input. The media content may be selected for playback without user input by either the media-playback device 102 or the media-delivery system 104. For example, media content can be selected for playback without user input based on stored user profile information, location, travel conditions, current events, and other criteria.

User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Although the media-playback device 102 is shown as a separate device in FIG. 1, the media-playback device 102 can also be integrated with the vehicle (e.g., as part of a dash-mounted vehicle infotainment system).

The media-playback device 102 includes a display 112. The display 112 shows the user information about media content that is producing media output 110. In some embodiments, the display 112 is part of an interface generated by the media-playback device 102 to interact with the user U.

In some embodiments, the user U interacts with the selectable content depth engine 108 through a user interface displayed on the display 112. User U selections determine the depth of the media content that the user U hears as media output 110. For example, if the user U is listening to a news program the user U can decide whether to hear just a headline for a story, or a brief version of the story, or the user U may want to hear the full story if it is of interest to the user U.

Figure 2:
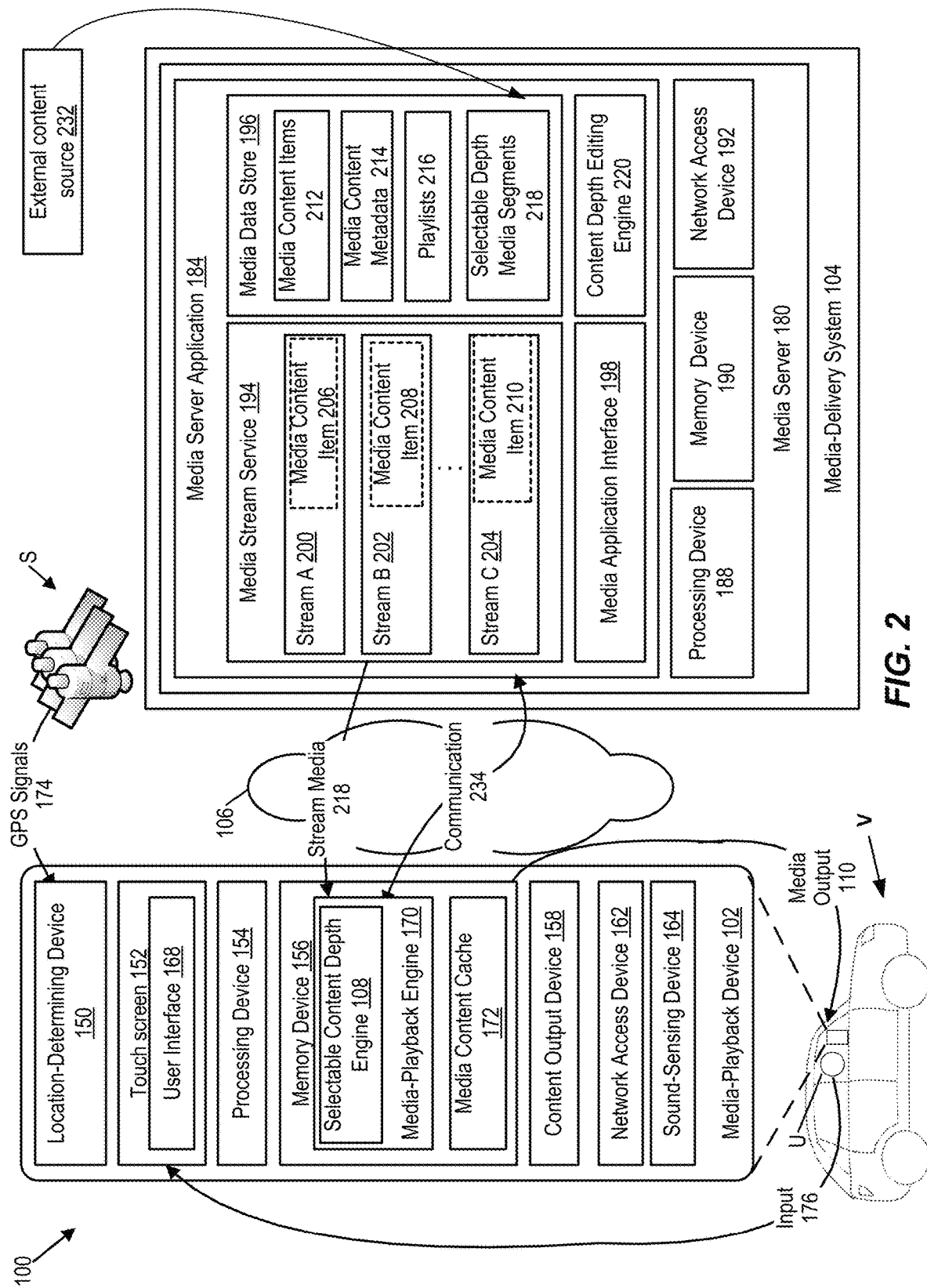
FIG. 2 is a schematic illustration of the example media-playback system of FIG. 1.

FIG. 2 is a schematic illustration of an example system 100 for media content playback. In FIG. 2, the media-playback device 102, the media-delivery system 104, and the network 106 are shown. Also shown are the user U in the vehicle V, and satellites S.

As noted above, the media-playback device 102 plays media content items. In some embodiments, the media-playback device 102 plays media content items that are provided (e.g., streamed, transmitted, etc.) by a system external to the media-playback device such as the media-delivery system 104, another system, or a peer device. Alternatively, in some embodiments, the media-playback device 102 plays media content items stored locally on the media-playback device 102. Further, in at least some embodiments, the media-playback device 102 plays media content items that are stored locally as well as media content items provided by other systems. The media-playback device 102 also plays selectable depth media segments that are created from media content items.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the location-determining device 150, the touch screen 152, the sound-sensing device 164, and the optical-sensing device 166.

The location-determining device 150 is a device that determines the location of the media-playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi positioning systems technology, and combinations thereof.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 168 for interacting with the media-playback device 102. As noted above, some embodiments do not include a touch screen 152. Some embodiments include a display device and one or more separate user interface devices for producing a display 112. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 170 that includes the selectable content depth engine 108. In some embodiments, the media-playback engine 170 selects and plays back media content and generates interfaces for selecting and playing back media content items.

The selectable content depth engine 108 assembles selectable depth media content items 218 received from the media server application 184 into selectable depth media programs. The selectable content depth engine 108 generates interfaces for navigating playback of the selectable depth media programs. Playback navigation of the selectable depth media programs is further described with respect to FIGS. 8-13.

Some embodiments of the memory device also include a media content cache 172. The media content cache 172 stores media-content items, such as selectable depth media segments that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media-content items such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like for which a user may wish to resume playback).

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U that is directed into an interior cabin of the vehicle V. Examples of the content output device 158 include a speaker assembly comprising one or more speakers, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device. Connected or paired devices can include headphones, speaker system, or vehicle head units.

The network access device 162 operates to communicate with other computing devices over one or more networks, such as the network 106. Examples of the network access device include one or more wired network interfaces and wireless network interfaces. Examples of wireless network interfaces include infrared, BLUETOOTH® wireless technology, 802.11a/b/g/n/ac, and cellular or other radio frequency interfaces.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate the media-playback device 102 (e.g., sounds within a vehicle in which the media-playback device 102 is located). In some embodiments, the sound-sensing device 164 comprises one or more microphones. For example, the sound-sensing device 164 may capture a recording of sounds from proximate the media-playback device 102. These recordings may be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words.

Additionally or alternatively, the sound-sensing device may determine various sound properties about the sounds proximate the user such as volume, dominant frequency or frequencies, etc. These sound properties may be used to make inferences about the environment proximate to the media-playback device 102 such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The media-delivery system 104 comprises one or more computing devices and provides media content items to the media-playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, a travel server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204. The media stream service 194 communicates selectable depth media segments to the media-playback device 102.

The media application interface 198 can receive requests or other communication from media-playback devices or other systems, to retrieve media content items from the media server 180. For example, in FIG. 2, the media application interface 198 receives communication 234 from the media-playback engine 170.

In some embodiments, the media data store 196 stores media content items 212, media content metadata 214, playlists 216, and selectable depth media segments 218. The media data store 196 may comprise one or more databases and file systems. As noted above, the media content items 212 may be audio, video, or any other type of media content, which may be stored in any format for storing media content. The selectable depth media segments 218 are media content items that have been edited. Editing can be performed by the content depth editing engine 220. In other embodiments, selectable depth media segments 218 are produced by an external source such as the external content source 232.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and, in some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The content depth editing engine 220 accesses media content items from external content sources 232 or from the local media data store 196. The content depth editing engine 220 then edits the media content items to produce versions of the media content item that have varying lengths and depths of content. In some embodiments, the selectable depth media segments 218 are produced by an external (third party) source such as a news source.

The versions of the media content item are assembled into a selectable depth media segments 218 that are stored in the media data store 196. The selectable depth media segments 218 include multiple versions of the same piece of media content.

In some embodiments the content depth editing engine 220 includes audio editing software running on a computing device. The audio editing software 220 operates to play media content items to an editor and to receive inputs from the editor to edit the media content items to generate the different versions of the media content item. In some embodiments the audio editing software generates a user interface including a waveform display. The waveform display can receive inputs directly therein from the editor (such as using an input device, such as a mouse) to identify, select, cut, copy, paste, rearrange, and delete portions of the media content item in order to generate the different versions of the media content item. In some embodiments speech-to-text technology (or, for example, closed captioning if available) is used to generate a transcript that can be displayed adjacent (e.g., above or below) the waveform which can assist the editor in quickly identifying portions of the media content item to be selected or removed.

In other embodiments the content depth editing engine 220 includes software that automates some or all of the generation of the versions of the media content item. For example, the software can automatically identify interesting portions of the media content item based on past user listening history (e.g., identifying what portions are most listened to, identifying what portions are most skipped, determining how often users skip to a particular part of the media content item, etc.). Machine learning algorithms can also be used in some embodiments to automatically generate versions of the media content item.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for media playback during travel, other embodiments are possible as well. For example, in some embodiments, the media-playback device 102 includes a media data store 196 and the media-playback device 102 is configured to select and playback media content items without accessing the media-delivery system 104. Further in some embodiments, the media-playback device 102 operates to store previously streamed media content items in a local media data store (e.g., the media content cache 172).

In at least some embodiments, the media-delivery system 104 can be used to stream, progressively download, or otherwise communicate music, other audio, video, or other forms of media content items to the media-playback device 102 for playback during travel on the media-playback device 102. In accordance with an embodiment, a user U can direct the input 176 to the user interface 168 to issue requests, for example, to playback media content for playback during travel on the media-playback device 102.

Figure 3:
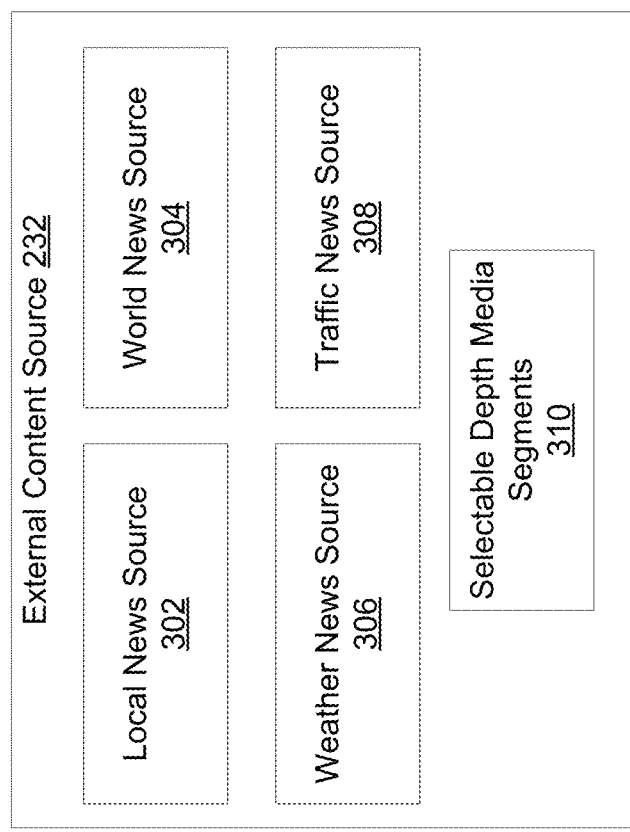
FIG. 3 is a schematic illustration of the external content source of FIG. 2.

FIG. 3 shows a schematic block diagram of an example of an external content source 232. The external content source 232 provides news content to the content depth editing engine 220. In some embodiments, the news content is being continually updated with pre-recorded content. In some embodiments, the external content source 232 includes a local news source 302, a world news source 304, a weather news source 306, and a traffic news source 308. More or less sources of news may be included. Additional types of news sources may be included or multiple sources for each type of news may be included.

The local news source 302 includes local news stories and may include news stories relevant to the local area of the user, such as a metropolitan area or town. The world news source 304 includes news stories from across the world. The weather news source 306 provides weather updates for the user's general geographic area. These updates may be specific to a zip code, a city, or a region. The traffic news source 308 provides traffic news updates that are relevant to the user. The updates may be relevant to the user's metropolitan area or the user's planned route.

The external content source 232 can also include selectable depth news stories 310. In some embodiments an external source produces the selectable depth news stories 310 and sends them preassembled to the media-delivery system 104. In embodiments where the media content is not news, the external content source 232 can include selectable depth podcasts, audiobooks, or other types of media content.

Figure 4:
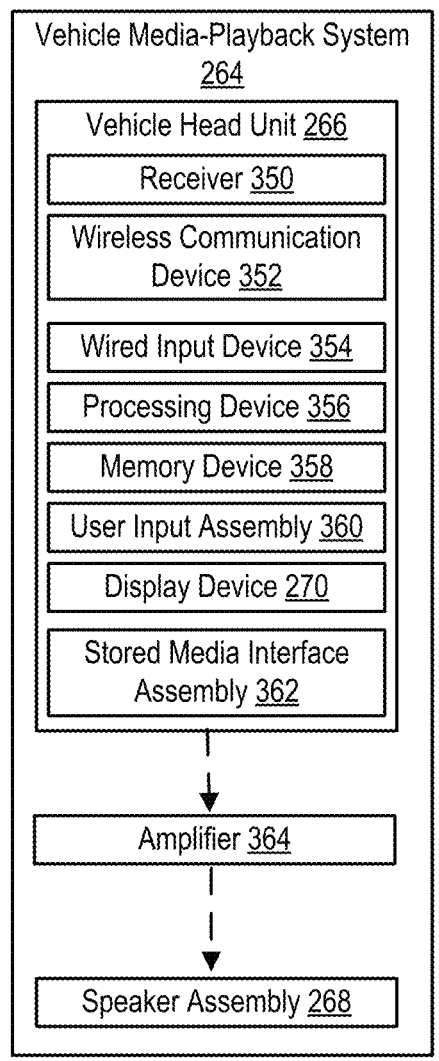
FIG. 4 is a schematic illustration of a vehicle media-playback system.

FIG. 4 is a schematic diagram of an embodiment of the vehicle media-playback system 264. In this example, the vehicle media-playback system 264 includes a vehicle head unit 266, an amplifier 364, and a speaker assembly 268.

The vehicle head unit 266 received user input and generates media content from various sources. In this example, the vehicle head unit 266 includes a receiver 350, a wireless communication device 352, a wired input device 354, a processing device 356, a memory device 358, a user input assembly 360, a display device 270, and a stored media interface assembly 362. The processing device 356 may be similar to the processing device 154 and the memory device 358 may be similar to the memory device 156.

The receiver 350 receives media content signals from various external sources. The received signals can then be used to generate media output by the vehicle media-playback system 264. The receiver 350 may comprise one or more tuners for receiving radio signals such as FM or AM radio signals. Additionally, the receiver 350 may comprise a receiver for receiving satellite radio signals.

The wireless communication device 352 communicates with other devices using wireless data signals. The wireless communication device 352 can include one or more of a Bluetooth transceiver and a Wi-Fi transceiver. The wireless data signal may comprise a media content signal such as an audio or video signal.

The wired input device 354 receives a cable for providing media content and/or commands. In some embodiments, the wired input device 354 can include an auxiliary input jack for receiving a plug that transmits an analog audio signals. The wired input device 354 can also include different or multiple input jacks for receiving plugs that transmit other types of analog or digital signals (e.g., USB, HDMI, Composite Video, YPbPr, DVI). In some embodiments, the wired input device 354 is also used to receive instructions from other devices.

The user input assembly 360 comprises one or more input devices for providing user input to the vehicle media-playback system 264. In some embodiments, the user input assembly 360 includes multiple knobs, buttons, and other types of input controls for adjusting volume, selecting sources and content, and adjusting various output parameters. In some embodiments, the various input devices are disposed on or near a front surface of the vehicle head unit 266. The various input devices can also be disposed on the steering wheel of the vehicle or elsewhere. Additionally or alternatively, the user input assembly 360 can include one or more touch sensitive surfaces, which can be incorporated in the display device 270.

The display device 270 displays information. In some embodiments, the display device 270 includes a liquid crystal display (LCD) panel for displaying textual information about content and/or settings of the vehicle media-playback system 264. The display device 270 can also include other types of display panels such as a light emitting diode (LED) panel. In some embodiments, the display device 270 can also display image or video content.

The stored media interface assembly 362 reads media content stored on a physical medium. In some embodiments, the stored media interface assembly 362 comprises one or more devices for reading media content from a physical medium such as a compact disc or cassette tape.

The amplifier 332 amplifies a signal received from the vehicle head unit 266 and transmits the amplified signal to the speaker assembly 268. In this manner, the media output 110 can be played back at a greater volume. The amplifier 332 may include a power source to power the amplification.

The speaker assembly 268 produces an audio output based on an electronic signal. The speaker assembly may comprise one or more speakers disposed at various locations within the vehicle. In some embodiments, separate signals are received for at least some of the speakers (e.g., to provide stereo or surround sound).

Figure 5:
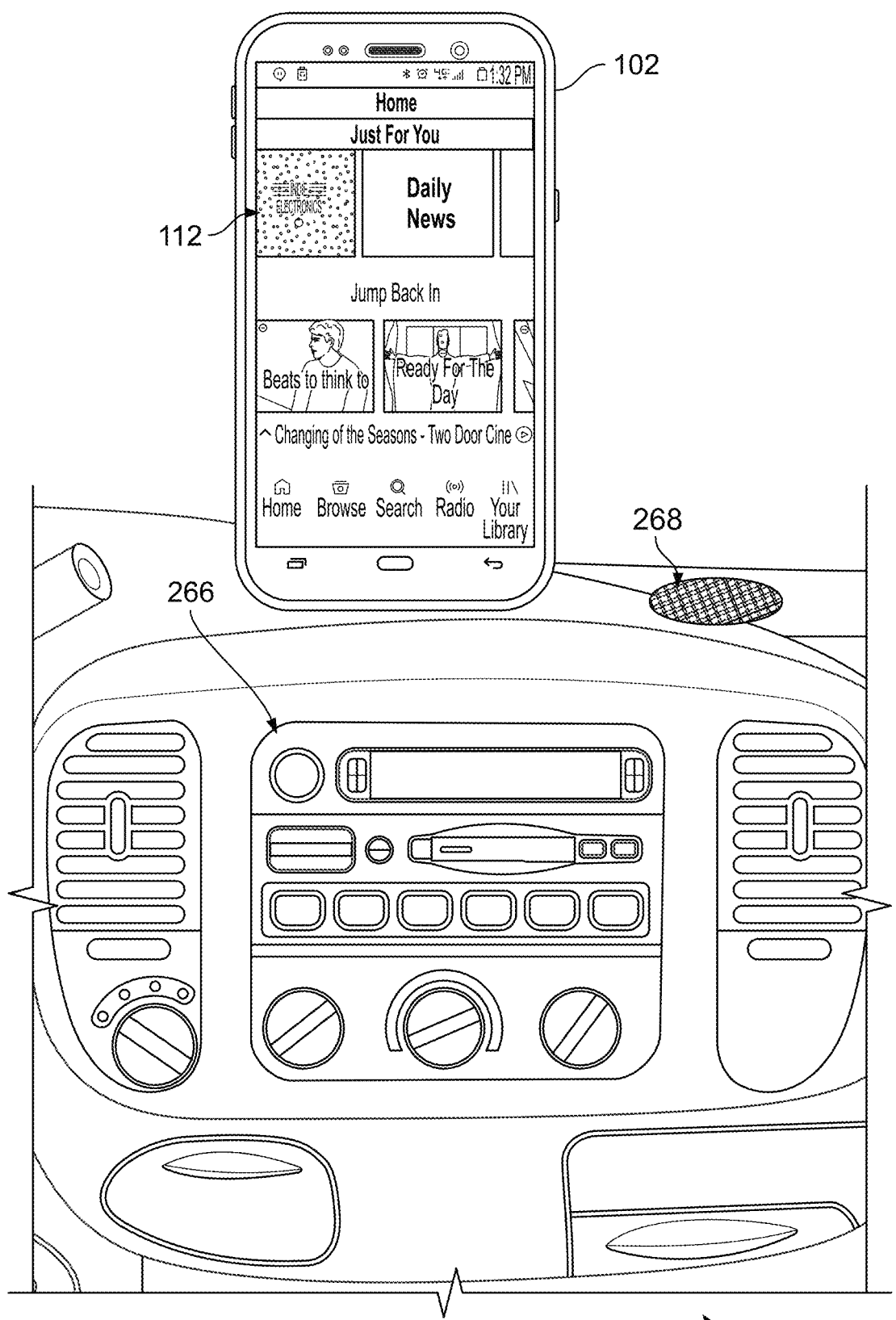
FIG. 5 is a schematic diagram of an embodiment of a vehicle media-playback system that incorporates a media-playback device.

FIG. 5 is a schematic diagram of an embodiment of a vehicle media-playback system 370 that incorporates a media-playback device. The vehicle media-playback system 370 is an example of the media-playback system 100. The vehicle media-playback system 370 includes a vehicle head unit 372 and the speaker assembly 268. In this example, the vehicle head unit 372 incorporates the components and functionality of both a media-playback device such as the media-playback device 102 and a vehicle head unit such as the vehicle head unit 266. The display device 270 is showing a user interface display 112 for selecting and playing back media content. The media output 110 is played within the interior cabin of the vehicle by the vehicle media-playback system 370 using the speaker assembly 268. Although alternatives are possible, the vehicle media-playback system 370 often also includes navigation, climate control, and vehicle maintenance capabilities too.

Figure 6:
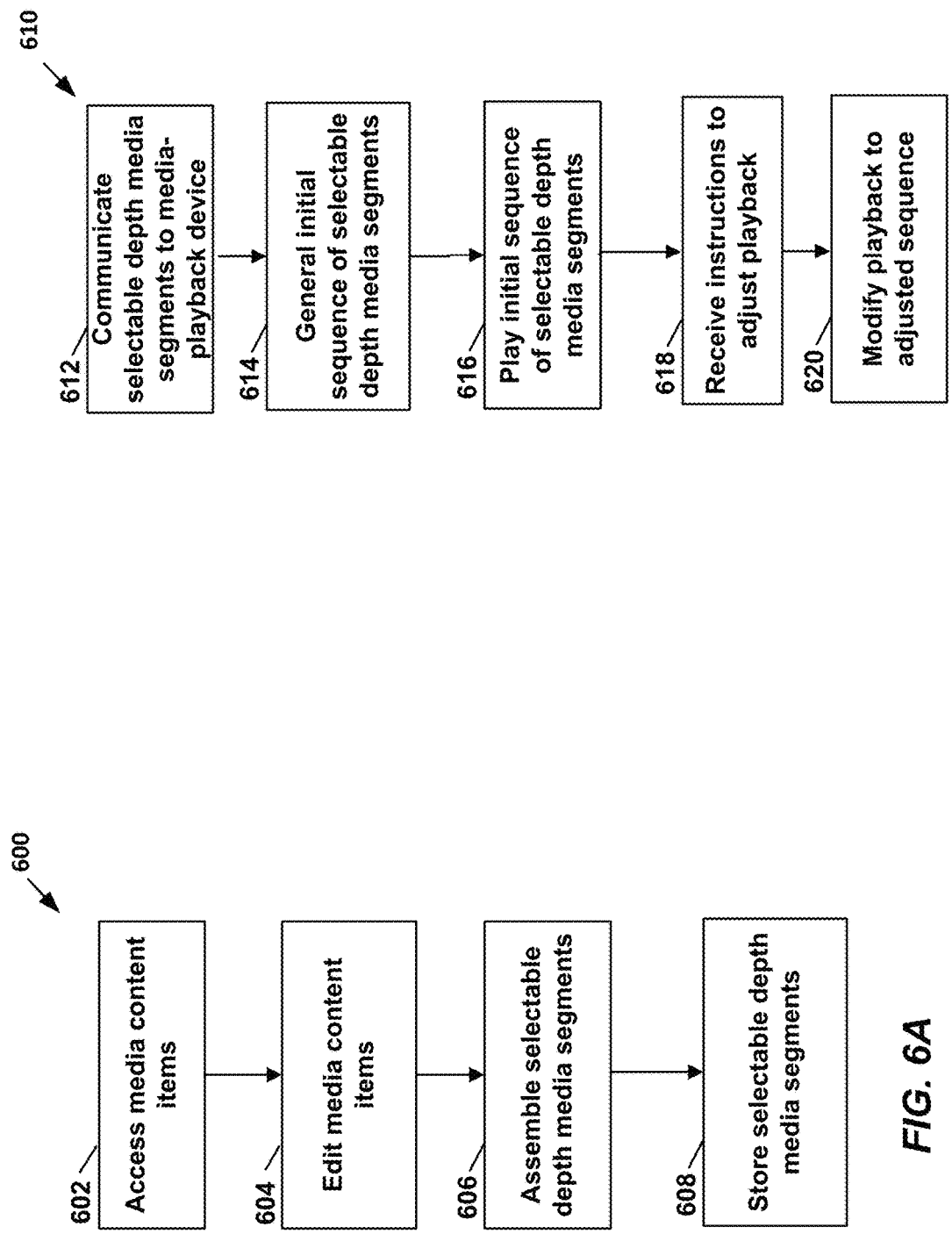
FIG. 6A shows a flow chart of an example method of generating a media program having selectable content depth.
FIG. 6B shows a flow chart of an example method of playing and navigating through a media program having selectable content depth.

FIG. 6A shows a flow chart of an example method 600 of generating a media program having selectable content depth. The media program consists of one or more media content items, such as news stories, that have varying levels of content depth. A user can select to listen to shorter segments of media content that go into less depth, such as news headlines, or longer segments of media content that go into more depth, such as full reports on a current issue.

At operation 602, one or more media content items are accessed from one or more media content sources. The media content source can include, for example, the external content source 232. The media content source can also be the media content items 212 in the media data store 196 depicted in FIG. 2. Other external content sources or local media data stores may serve as media content sources. In some embodiments, the media content items are portions of a larger media program with each portion having distinct subject matter. For example, the media content items may be portions of a news program and each portion is a separate news story. In other embodiments, the media content items may be individual news stories, audiobooks, music programs, podcasts, comedy programs, and the like.

At operation 604, the media content items are edited. Each media content item is edited to produce multiple versions of the content having different lengths and depths of content. Editing can be performed by an external source or by the content depth editing engine 220.

A first version of the media content item has a first duration, a second version has a second duration, and a third version has a third duration. The second duration is longer than the first duration, and the third duration is longer than the second duration. The first version may be a headline or title of the media content item. The second version may be a brief or summary of the media content item. The third version may be a full or complete version of the media content item. In some embodiments, the media content items are edited to produce a headline version of the media content item, a brief version that is longer than the headline version, and a full version that is longer than the brief version. In some aspects, each selectable depth media segment includes four or more versions.

In embodiments where the media content items comprise a single subject matter, such as individual news stories, the media content items are divided into the three different versions of content. Each version has a different length and depth of content. In some aspects, the headline version is the beginning of the media content, the brief version is the middle of the media content, and the full version is the end of the media content. In embodiments where the media content items are segments of a larger media program which includes a variety of subject matter, one media program could be divided into multiple versions of multiple media segments. In such instances, an audio track is simply cut into multiple clips of different lengths to produce different versions to produce a selectable depth media program. An example of this type of embodiment is described further with respect to FIG. 7.

In some embodiments, the media content item may not include pre-existing content that properly serves as a headline version or a brief version. Such media content items cannot be easily edited to produce clips that are suitable for a selectable depth media program. In such embodiments, the media content items are analyzed to identify core information identifying the media content item, such as metadata describing a title of the media content item. The system then converts the metadata text to speech output to create the headline version of the media content item. In other instances, the media content item's audio content is analyzed with software to identify the key features of the content. The media content items can be analyzed to identify information summarizing the entire content of the media content item. Speech output corresponding to the summarized information is produced to create the brief version of the media content item. The speech output can be computer generated or manually recorded by a human speaker for each media content item. The speech output can be produced by an external, third party source such as a news source.

Figure 9:
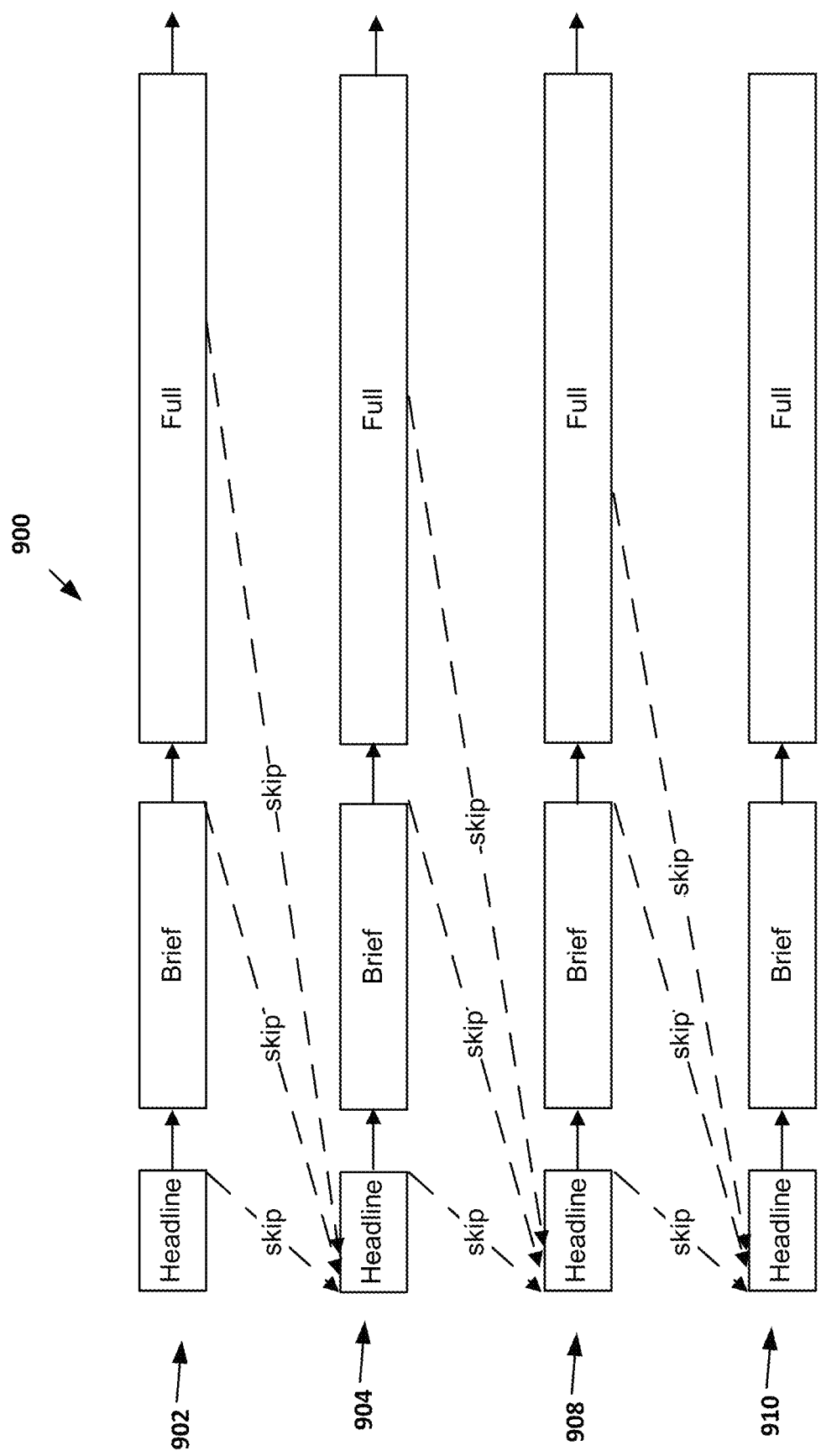
FIG. 9 shows a diagram of an example selectable depth media program according to the method of FIG. 8.
Figure 12:
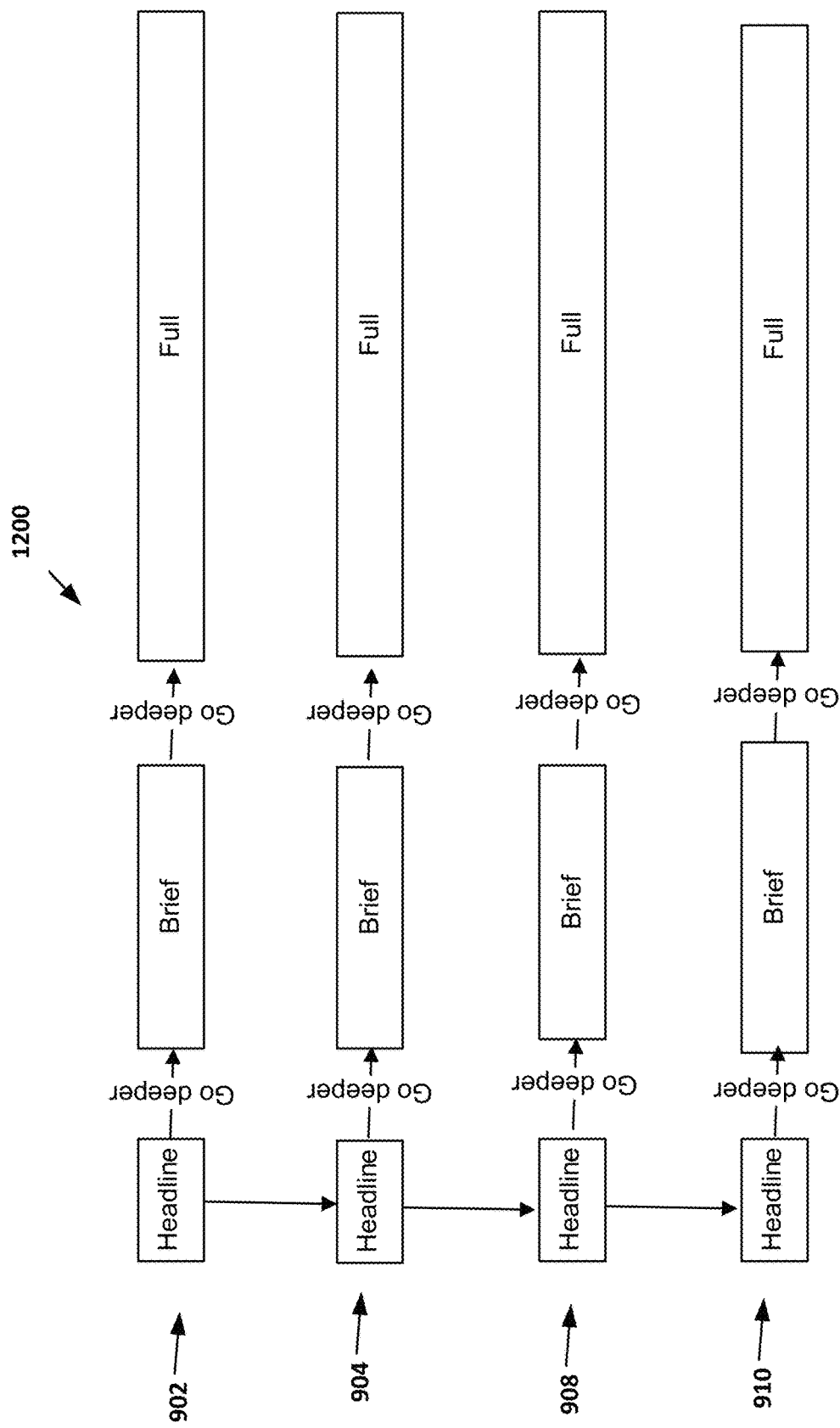
FIG. 12 shows a diagram of an example selectable depth media program according to the method of FIG. 11.

At operation 606, the versions of the media content items are assembled into selectable depth media segments. Each selectable depth media segment includes a first, second, and third version of the media content. In some embodiments, the selectable depth media segment includes a headline version, a brief version, and a full version of the same media content item. In some embodiments, the headline version, brief version, and full version of each media content item are grouped together so that the brief version follows the headline version and the full version follows the brief version. An example of this arrangement is shown in FIG. 9. In other embodiments, the brief version and full version of each media content item are linked to the headline version of the media content item. An example of this arrangement is shown in FIG. 12.

At operation 608, the selectable depth media segments are optionally stored. If an external source produced the selectable depth media segments, they are first received from the external content source. In some embodiments, the selectable depth media segments 218 are stored in the media data store 196 of the media-delivery system 104 of FIG. 2. Other storage locations are possible. In some embodiments, the selectable depth media segments are not stored at the media-delivery system 104 and are immediately communicated to one or more media-playback devices as described in operation 612.

FIG. 6B shows a flow chart of an example method 610 of playing a media program having selectable content depth. The selectable content depth media program can be navigated by receiving inputs from a user that instruct a media-playback device to modify an initial sequence of selectable depth media segments.

At operation 612, the selectable depth media segments are communicated to a media-playback device. In some embodiments, the selectable depth media segments are communicated to the media-playback engine 170 through communication 234. In some embodiments, the selectable depth media segments are temporarily stored in the media content cache 172 of the media-playback device 102 before being accessed by the selectable content depth engine 108.

At operation 612, the selectable depth media segments are received at the media-playback device 102 and are assembled into a selectable depth media program by the selectable content depth engine 108. In one embodiment, the selectable depth media program is configured to play each selectable depth media segment starting with the headline or first version, followed by the brief or second version, followed by the full or third version. Upon receiving a skip command, the program is configured to play the headline version of the next selectable depth media segment. In another embodiment, the media program is configured to play only the headline of each selectable depth media segment unless a command is received to play a more in-depth version of the media segment, in which case the brief version and/or full version of the media segment is played before playing the next headline version.

At operation 614, an initial playback sequence of select depth media segments is generated. In some embodiments, the initial playback sequence is determined by the selectable content depth engine 108 of the media-playback device 102. In some embodiments, the initial playback sequence of selectable depth media segments is the first version of the first selectable depth media segment followed by the second version of the first selectable depth media segment followed by the third version of the first selectable depth media segment followed by the first version of a second selectable depth media segment followed by the second version of the second selectable depth media segment followed by the third version of the second selectable depth media segment, and so on. In other embodiments, the initial playback sequence of selectable depth media segments is the first version of a first selectable depth media segment followed by a first version of a second selectable depth media segment followed by a first version of a third selectable depth media segment, and so on.

At operation 616, the initial playback sequence of the selectable depth media program is played at the media playback device 102 through the content output device 158. In one embodiment, the first or headline version of a media content item is played, followed by the second or brief version of the first media content item, followed by the third or full version of the first media content item. An example of this embodiment is further described with respect to FIGS. 8-10.

In another embodiment, the first or headline version of the first media content item is played, followed by the first or headline version of a second media content item, followed by the first or headline version of a third media content item. An example of this embodiment is further described with respect to FIGS. 11-13.

At operation 618, instructions are received to adjust playback. In one embodiments, this command instructs the media-playback device to skip from playing the first selectable depth media segment to the second selectable depth media segment. The adjusted playback sequence of selectable depth media segments is to play the first version of the second selectable depth media segment before the third version of the first selectable depth media segment has concluded. In another embodiment, this command instructs the media-playback device to play at least the second version of the first selectable depth media segment before the first version of the second selectable depth media segment. Only upon receiving a selection to play a more in-depth version of the media content item does playback initiate for the second or brief version of the media content item. If the second or brief version of a media content item is currently playing, receiving a selection to play a more in-depth version of the media content item initiates playback of the third or full version of the media content item.

At operation 620, the adjusted playback sequence is played at the media-playback device. Examples of adjusted playback sequences are illustrated in FIGS. 8-9 and 11-12. The adjusted playback sequence can be further modified by receiving commands from a user to adjust playback. As discussed above, in one aspect the command is to skip to the next media item and in another aspect the command is to "go deeper" to play a more in-depth version of the media item that is currently playing.

Figure 7:
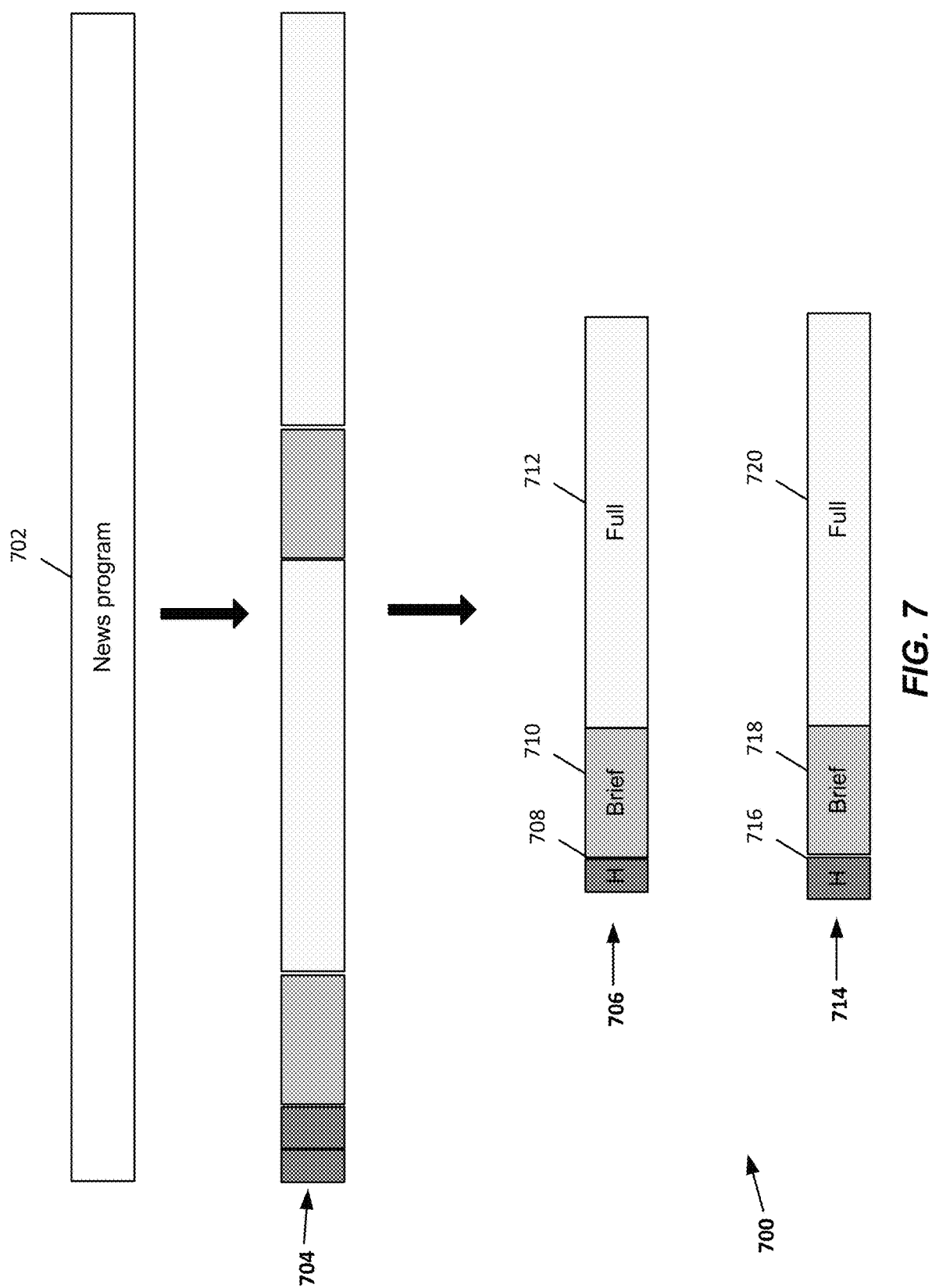
FIG. 7 shows a diagram illustrating how a news program is edited to produce selectable depth news stories.

FIG. 7 shows a diagram 700 illustrating how a news program is edited to produce selectable depth news stories. The news program 702 is divided into a plurality of versions 704 before being assembled into selectable depth news stories 706, 714. In embodiments where the media content items are news stories taken from a larger news program, the headline versions of the news stories may be taken from the beginning of the news program. The brief and full versions of stories may be grouped together within the news program.

In some embodiments, one or more of the headline version and brief version are generated using one or more of text-to-speech technology or by recording a human speaker. Text-to-speech software analyzes text files, such as a written news story, and produces speech output using a computer. Alternatively, each version of a news story can be manually recorded by speaking into a microphone and recording the speech on a media storage device.

In the example of FIG. 7, an existing news program 704 is edited into smaller clips to produce multiple versions of each news story within the news program. In one method of editing a news program, the headline version 708, 716 of the selectable depth news stories 706, 714 are taken from the beginning of the news program 704. The first brief version 710 and first full version 712 follow the headlines and are followed by the second brief version 718 and second full version 720 within the original news program 702. Segments of the news program are rearranged to create the final selectable depth news stories 706, 714.

Figure 8:
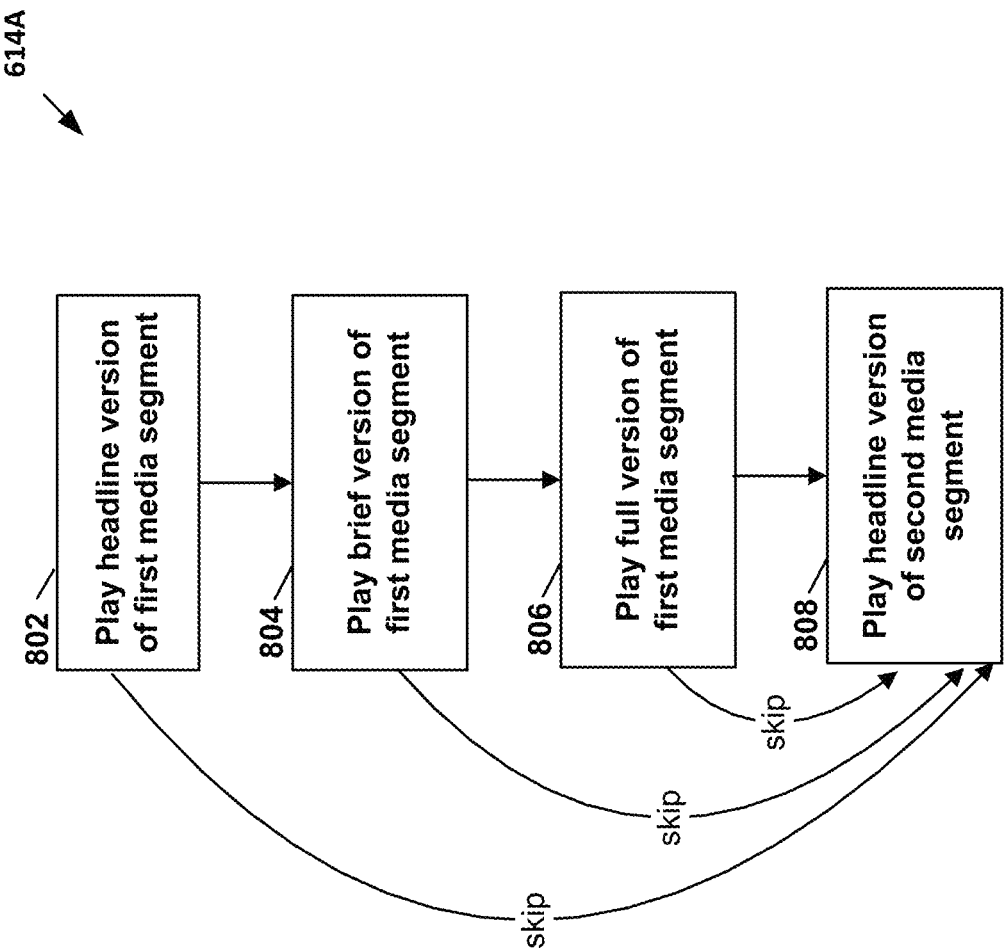
FIG. 8 shows a flow chart of an example method of navigating playback of selectable depth media segments.

FIG. 8 shows a flow chart of an example method 614A of navigating playback of a selectable depth media program. In some embodiments, the selectable depth media program is composed of multiple selectable depth media segments, which are composed of multiple versions of a media content item. In some embodiments, the selectable depth media program is a news program composed of multiple news stories each having a headline version, a brief version, and a full version of a news story.

At operation 802, the first or headline version of the first selectable depth media segment is played. If a skip command is received while the first version of the first selectable depth media segment is playing, playback of the first version of the first selectable depth media segment will cease as playback of the first or headline version of the second media segment is initiated at operation 808. If no command is received, the method will proceed to operation 804.

At operation 804, the brief or second version of the first media segment is played. Again, if a skip command is received, the second version of the first media segment will stop playing and playback of the first version of the second media segment will start at operation 808. If no skip command is received, the method will proceed to operation 806 after the brief version of the first media segment concludes playback.

At operation 806, the full or third version of the first media segment is played. If a skip command is received at any point during playback of the full version of the first media segment, playback of the full version of the first media segment will cease as playback of the first or headline version of the second media segment is initiated at operation 808. If no skip command is received, playback of the full version of the first media segment will continue until its conclusion and the method will then proceed to operation 808.

At operation 808, the headline or first version of the second selectable depth media segment is played. Operation 808 is similar to operation 802. Playback will continue through to the brief version of the second media segment, and so on, unless a skip command is received to initiate playback of the third media segment.

FIG. 9 shows a diagram 900 of an example selectable depth media program according to the method of FIG. 8. In this method, playback of the headline version, followed by the brief version, followed by the full version of each media content item will continue unless a skip command is received from a user. This is the initial playback sequence. In this example, if no skip commands are received, the headline, brief, and full version of the first media content item 902 would play in order, followed by the entire second media content item 904, followed by the entire third media content item 908, followed by the entire fourth media content item 910. However, if a skip command is received at any point during playback of the headline version, brief version, or full version of a media content item, playback will skip to the beginning of the headline version of the next media content item. For example, if a skip command is received during the brief version of the first media content item 902, playback will skip to the headline version of the second media content item 904.

In some embodiments the media content items are news stories. In the example of FIG. 9, a user hears a news headline, followed by a brief version of the news story, followed by the full, in depth version of the news story unless the user commands the media-playback device 102 to skip to the next news story. Perhaps the user is only interested in hearing the news headlines. In that case, the user could tell the system to skip after hearing each headline. If one of the headlines sounds interesting to the user, the user simply keeps listening and more in depth content is provided on that particular news story.

Figure 10C:
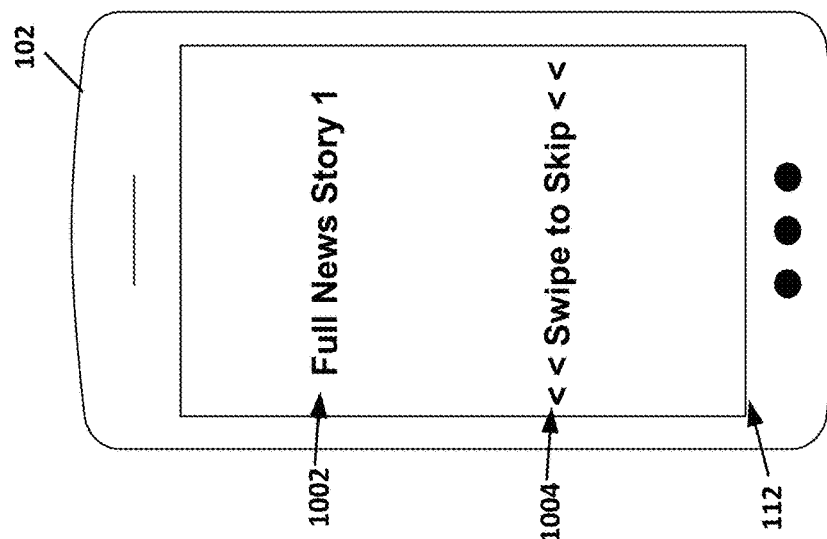
FIG. 10C shows another example user interface implementing the method of FIG. 8.
Figure 10B:
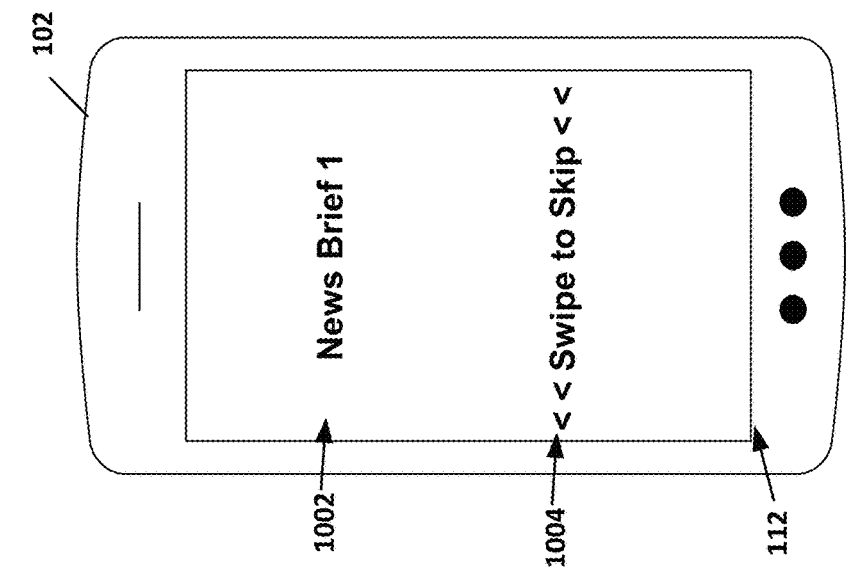
FIG. 10B shows another example user interface implementing the method of FIG. 8.
Figure 10A:
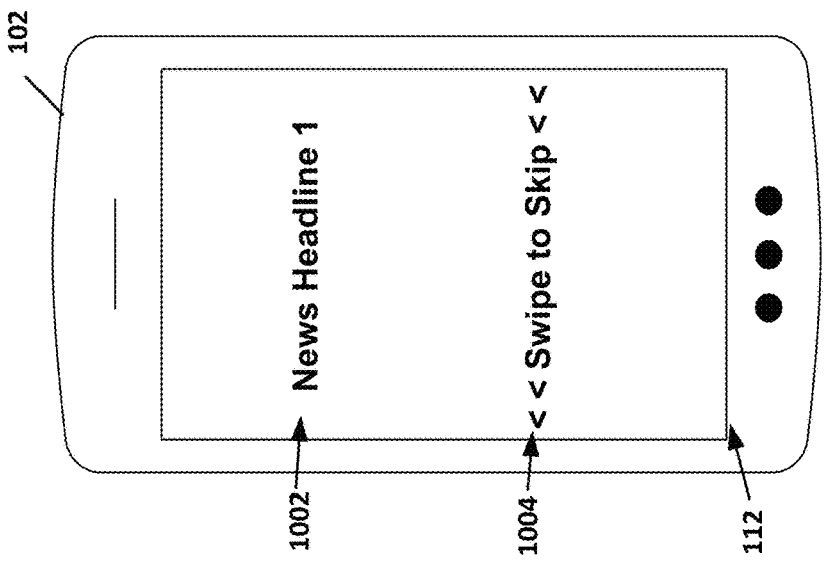
FIG. 10A shows an example user interface implementing the method of FIG. 8.

FIGS. 10A-10C illustrate embodiments of the user interface display 112 on a media-playback device 102 as the method of FIG. 8 is implemented. The user can interact with the display 112 through a touch screen 152 or by voice commands.

In FIG. 10A, a title 1002 of the currently playing media segment version is displayed. A visual swipe indicator 1004 is shown where a user can use a swipe gesture on the touch screen of the display 112 to skip to the next media segment. FIG. 10A shows that a headline version is currently playing, corresponding to operation 802 of FIG. 8. If the user swipes to skip, playback will skip to the next media segment. If no command is received, playback will continue and the display will progress to that of FIG. 10B.

The display of FIG. 10B corresponds with operation 804 of FIG. 8. The title 1002 indicates that the brief version of the news story is now playing. If the user swipes to skip, playback will skip to the next media segment. If no command is received, playback will continue and the display will progress to that of FIG. 10C.

The display of FIG. 10C corresponds with operation 806 of FIG. 8. The title 1002 indicates that the full version of the news story is now playing. If the user swipes to skip, playback will skip to the next media segment before completing playback of the full version of the news story that is currently playing. If no command is received, playback will continue until the news story is completed and may continue to another news story.

Figure 11:
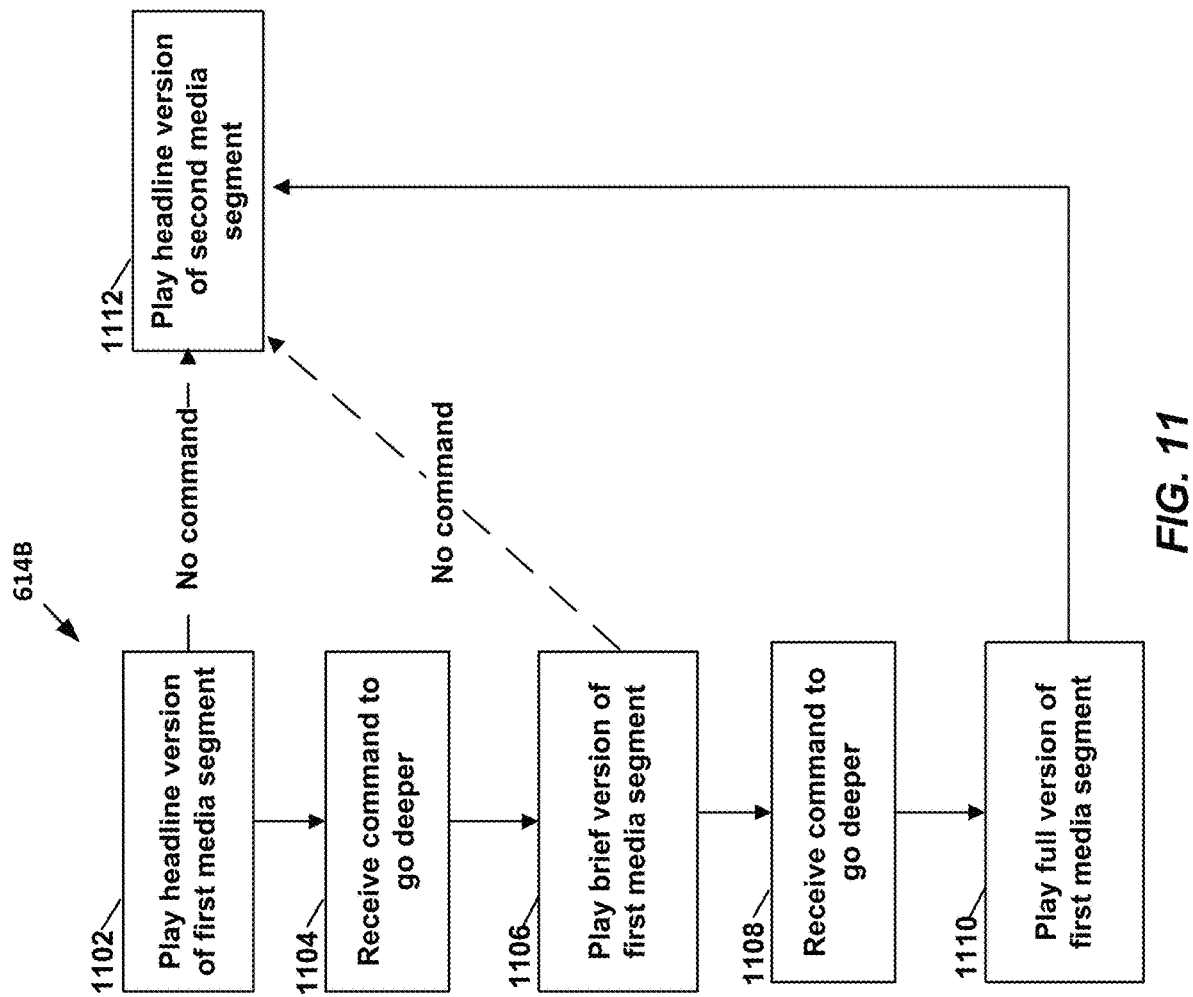
FIG. 11 shows a flow chart of another example method of navigating playback of selectable depth media segments.

FIG. 11 shows a flow chart of another example method 612B of navigating playback of a selectable depth media program. In some embodiments, the selectable depth media program is composed of multiple selectable depth media segments, which are composed of multiple versions of a media content item. In some embodiments, the selectable depth media program is a news program composed of multiple news stories each having a headline version, a brief version, and a full version of a news story.

At operation 1102, the first or headline version of the first selectable depth media segment is played. If no action is taken by a user listening to the selectable depth media program, the method will continue to operation 1112. This allows the initial playback sequence to continue playing. If the user issues a command to go deeper, at operation 1104, the method will continue to operation 1106. This causes the media-playback device to adjust playback to produce an adjusted playback sequence.

At operation 1106 the second or brief version of the first selectable depth media segment is played. If no action is taken by a user listening to the selectable depth media program, the method will continue to operation 1112. If the user issues a command to go deeper, at operation 1108, the method will continue to operation 1110. Thus, a second version of an adjusted playback sequence is produced.

At operation 1110 the third or full version of the first selectable depth media segment is played. After playback of the first selectable depth media segment concludes, the method continues to operation 1112.

At operation 1112, the first or headline version of the second selectable depth media segment is played. Playback of the selectable depth media program will continue in a similar manner as described for operations 1102-1112 if additional media segments are included in the program.

FIG. 12 shows a diagram 1200 of an example selectable depth media program according to the method of FIG. 11. In this method, playback of the headline of each media content item will continue without playing the brief or full versions of the media content items unless the user inputs a command to "go deeper." If no commands are issued, playback of the headline of the first media content item 902 follows immediately by the headline of the second media content item 904, which is followed by the headline of the third media content item 908 and the headline of the fourth media content item 910. However, if the user inputs a command to "go deeper" after any headline version, playback will continue into a brief version of the currently playing media content item. Once the brief version of the media content item has played, the next headline version will play unless the user again inputs a command to "go deeper" and play the full version of the media content item.

In some embodiments the media content items are news stories. In the example of FIG. 12, a user only hears news headlines unless the user provides input to command the media-playback device 102 to play a more in depth version of the news story. If the user commands the system to "go deeper," a brief version of the news story will be played. If the user wanted to "go deeper" again, the full version of the news story would be played.

FIGS. 13A-13C illustrate embodiments of the user interface display 112 on a media-playback device 102 as the method of FIG. 11 is implemented. The user can interact with the display 112 through a touch screen 152 or by voice commands.

In FIG. 13A, a title 1002 of the currently playing media segment version is displayed. A "go deeper" button 1302 is shown where a user can use a tap gesture on the touch screen of the display 112 to play a more in depth version of the currently playing news story. FIG. 13A shows that a headline version is currently playing, corresponding to operation 1102 of FIG. 11. If the user taps to "go deeper", playback will continue to the brief version of the news story, as shown in FIG. 13B. If no command is received, playback will continue and the headline version of the next media segment will be played.

The display of FIG. 13B corresponds with operation 1106 of FIG. 11. The title 1002 indicates that the brief version of the news story is now playing. If the user taps to "go deeper," playback will continue to the full version of the news story, as shown in FIG. 13C. If no command is received, playback will continue and the headline version of the next news story will be played.

The display of FIG. 13C corresponds with operation 1110 of FIG. 11. The title 1002 indicates that the full version of the news story is now playing. Because the most in-depth version of the news story is already playing, there is no option to "go deeper." Playback will continue until the news story is completed and may continue to play the headline of the next news story.

As noted previously, although many of the examples provided above are described with respect to traveling in a vehicle, other embodiments relate to other forms of travel or even other types of activities in which a user should not be distracted. Also, while many of the examples provided above are described with respect to news programs, other embodiments relate to other forms of media content.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for generating a media program having selectable content depth, the system comprising:
  one or more media content sources storing a plurality of selectable depth media segments, each of the selectable depth media segments comprising a first version having a first duration, a second version having a second duration, and a third version having a third duration;
  a processing device;
  a media data store; and a memory device encoding instructions that, when executed by the processor, cause the processing device to:
  generate a playback sequence of selectable depth media segments comprising two or more selectable depth media segments selected from the one or more media content sources, the playback sequence comprising, for each of the two or more selectable depth media segments, the first version followed by the second version followed by the third version;
  communicate the playback sequence to a media-playback device operating in a vehicle;
  receive instructions to adjust playback of the playback sequence during playback, wherein the instruction comprises a skip command; and
  modify playback of the playback sequence to play the first version of a next selectable depth media segment in the playback sequence.

2. The system of claim 1, wherein the one or more media content sources comprise one or more of external content sources and local media data stores.

3. The system of claim 1, wherein the memory device further comprises instructions that cause the processor to, prior to generating a playback sequence of selectable depth media segments:
  edit one or more media content items accessed from the one or more media content sources to produce the first version having the first duration, the second version having the second duration, and the third version having the third duration; and
  assemble the first version, second version, and third version of each media content item into the plurality of selectable depth media segments.

4. The system of claim 3, wherein the media content items comprise one or more of news stories, audiobooks, podcasts, comedy programs, and music programs.

5. The system of claim 4, wherein the media content items are news stories and the plurality of selectable depth media segments are selectable depth news stories.

6. The system of claim 3, wherein for each of the media content items the first version is a title of a media content item, the second version is a summary of the media content item, and the third version is a full version of the media content item.

7. The system of claim 1, wherein the media-playback device comprises:
  a processing device;
  a content output device;
  a memory device encoding instructions that, when executed by the processing device of the media-playback device, cause the processing device of the media playback device to:
    receive the playback sequence of selectable depth media segments;
    play the playback sequence of selectable depth media segments through the content output device;
    receive a skip command;
    communicate instructions to adjust playback of the playback sequence by skipping from a currently playing selectable depth media segment to the first version of the next selectable depth media segment in the playback sequence;
    cease playback of the currently playing selectable depth media segment; and
    play the first version of the next selectable depth media segment in the playback sequence.

8. The system of claim 1, wherein the memory device further comprises instructions that cause the processing device to store the playback sequence of selectable depth media segments in the media data store.

9. The system of claim 1, wherein the second duration is longer than the first duration and the third duration is longer than the second duration.

10. A method of generating a media program having selectable content depth, the method comprising:
  editing one or more media content items to produce a headline version, a brief version, and a full version of each media content item;
  assembling selectable depth media segments to each include a headline version, followed by a brief version, followed by a full version of the same media content item;
  generating a playback sequence of the selectable depth media segments;
  communicating the initial playback sequence to a vehicle media-playback system for playback; and
  upon receiving instructions to skip a current selectable depth media segment, ceasing playback of the current selectable depth media segment and initiating playback of a next selectable depth media segment in the playback sequence.

11. The method of claim 10, wherein the media content items are portions of a media program, each media content item having distinct subject matter.

12. The method of claim 10, wherein editing comprises dividing the media content item into clips to produce the versions of the media content item, wherein the beginning of the media content is the headline version, the middle of the media content is the brief version, and the end of the media content is the full version.

13. The method of claim 10, wherein editing comprises:
  analyzing the media content item to identify core information identifying the media content item and producing speech output to produce the headline version of the media content item; and
  analyzing the media content item to identify information summarizing the entire content of the media content item and producing speech output to produce the brief version of the media content item.

14. The method of claim 10, wherein editing comprises using software to automatically identify interesting portions of the media content item based on past user listening history.

15. The method of claim 10 wherein the media content items are news programs that are divided into individual news stories before being edited.

16. The method of claim 10, wherein the brief version is longer than the headline version and the full version is longer than the brief version.

17. One or more non-transitory computer-readable media having computer-executable instructions embodied thereon that, when executed by one or more computing devices, cause the one or more computing devices to:
  edit one or more media content items accessed from one or more media content sources to produce, for each media content item, a headline version, a brief version, and a full version;
  assemble the headline version, brief version, and full version of each media content item into a selectable depth media segment;
  generate an initial playback sequence of at least the headline version of each selectable depth media segment;

communicate the initial playback sequence to a media server application; and responsive to a skip command, modify playback of the initial playback sequence to an adjusted playback sequence to play a headline version of a next selectable depth media segment.

18. The one or more non-transitory computer-readable media of claim 17, further comprising computer-executable instructions that, when executed by one or more computing devices, cause the media server application to communicate the initial playback sequence to a media-playback device integrated into a vehicle media-playback system.

19. The one or more non-transitory computer-readable media of claim 17, wherein the brief version is longer than the headline version and the full version is longer than the brief version.

* * * * *